United States Patent [19]

Kauss

[11] Patent Number: 4,878,543
[45] Date of Patent: Nov. 7, 1989

[54] METHOD FOR CONTROLLING AN ATTACHMENT TO AGRICULTURAL TRACTORS

[75] Inventor: Wolfgang Kauss, Lohr-Wombach, Fed. Rep. of Germany

[73] Assignee: Mannesmann Rexroth GmbH, Lohr/Main, Fed. Rep. of Germany

[21] Appl. No.: 45,263

[22] Filed: Apr. 20, 1987

Related U.S. Application Data

[63] Continuation of Ser. No. 712,258, Mar. 15, 1985, abandoned.

[30] Foreign Application Priority Data

Mar. 19, 1984 [DE] Fed. Rep. of Germany ....... 3409604
Jan. 19, 1985 [DE] Fed. Rep. of Germany ....... 3501568

[51] Int. Cl.⁴ ............................................. A01B 63/11
[52] U.S. Cl. ........................................ 172/2; 172/3; 172/4; 172/7
[58] Field of Search ......................... 172/2, 3, 4, 7

[56] References Cited

U.S. PATENT DOCUMENTS

| 4,282,933 | 8/1981 | Suganami et al. | 172/7 X |
| 4,385,353 | 5/1983 | Schneider | 172/2 X |
| 4,423,785 | 1/1984 | Kurihara et al. | 172/3 |
| 4,535,847 | 8/1985 | Hasegawa et al. | 172/2 |

FOREIGN PATENT DOCUMENTS

| 57-17021 | 1/1982 | Japan | 172/2 |
| 626169 | 8/1978 | U.S.S.R. | 37/DIG. 1 |
| 2123670 | 2/1984 | United Kingdom | 172/7 |

Primary Examiner—Leo P. Picard

[57] ABSTRACT

A method of controlling an attachment to an agricultural tractor in which the absolute movement of the attachment is determined by a motion sensor mounted thereon and is utilized as a control standard while the relative motion of the attachment with respect to the tractor, influenced by the controller and carried out by a power lift, is determined in such a way that the absolute movement of the attachment becomes zero. This control method achieves that the attachment maintains a constant position in space in spite of the pitch movements of the tractor acting as disturbances. This guarantees an automatic tilling process, for instance a uniform depth of the furrows when plowing. By utilizing superimposed feedbacks of further control standards, such as relative position and motor load, changes in the absolute position of the attachment are possible and overloading of the motor is avoided.

15 Claims, 8 Drawing Sheets

NOMINAL VALUE
(SET VALUE)

METHOD FOR CONTROLLING AN ATTACHMENT TO AGRICULTURAL TRACTORS

This application is a continuation of application Ser. No. 712,258, filed Mar. 15, 1985, now abandoned.

BACKGROUND OF THE INVENTION

This invention relates to a method for controlling an attachment at an agricultural tractor.

Machines for dragging implements, such as tractors, because of their conditions of use and the functions to be performed, and also because of economic considerations are usually constructed without springs. Such vehicles are therefore, very easily and strongly caused to vibrate by unevenness of the roadway because of the elastic properties and low damping of their tires, with the frequencies of excitation usually lying in the area of their natural frequency. The movements of the tractor thus effected by the vibrations lead to considerable disturbances in the operation of an attachment connected to the tractor via a power lift, i.e., an attachment that does not have its own drive elements, such as wheels or the like. Thus, plowing as the most important ground preparation method, with a rigid coupling between tractor and plow, would only be possible with an idealized, completely flat field. In reality, however, the tractor according to its oscillation behavior follows the roughnesses of the field and can thereby be subject to considerable angular deflections, i.e., pitching motions, so that the relative position between tractor and plow must be changed continuously to ensure that the plow remains in the ground.

To this end, for a long period of time, a method based on traction control has been used, which shall be illustrated at this point in connection with FIGS. 1 and 2.

FIG. 1 shows a tractor 1 with a plow 2 which is connected to the tractor via a tie-rod mechanism 3. The tie-rod mechanism is subject to a power lift 4 for varying the relative position between the tractor and the plow, the power lift being actuated by a hydraulic cylinder 5. The cylinder is supplied with pressure fluid via a valve 6 which is controlled by a controller or regulator 7, as will be explained in detail in connection with the block diagram of FIG. 2 illustrating the control circuit. In FIG. 2 the function or transient or step response of the respective control circuit member is illustrated, i.e., the response or starting function respectively, for a sudden steplike change in the input signal. In FIG. 2 t represents time plotted on the abscissa In the conventional traction control circuit the sum of the forces acting in the measuring direction at a measuring spring 8 arranged between a fixed point at the tractor and the tie-rod mechanism 3, is used as the control standard or controlled variable. In the example illustrated the control and measuring direction is parallel to the ground 9. The sum of these forces is thus determined from the traction force, resulting from the depth to be plowed and the corresponding ground resistance characteristic, plus a corresponding component in the measuring direction of the weight of the plow (zero when driving horizontally); with all forces taken into consideration only the respective components in the measuring direction being of importance. The control operates, in this case in such a manner that it detects a change in the force acting on the measuring spring and is controlled to be zero by the movement of the plow.

For the mathematical description in the control circuit, the position of the plow must be determined as to its coordinates, as illustrated in FIG. 1. The coordinate z describes the absolute position of the tractor, whereas the coordinate a describes the relative position between the plow and the tractor. Upon a variation of one or both of these coordinates the absolute position of the plow is changed accordingly, as described by the coordinate a-z, i.e., the value a-z represents the deviation of the plow from its original position Because of a change in the absolute position a-z of the plow and/or because of a change in the characteristic of the ground resistance, which is indicated in FIG. 2 by several characteristic curves in the transfer function in the block diagram for the ground 9, a change in the force F at the measuring spring 8 occurs. The characteristic curves of the ground 9 are intended to encompass changes in the angle of ground inclination or slope or changes in the resistance at the same plowing depth The change in the force F causes a deflection f of the measuring spring, from which the controller forms together with a suitable nominal or set value w an output y which acts on the valve 6 and causes a corresponding pressure fluid flow g per time unit to the cylinder. Due to a lift h of the cylinders following from this fluid flow, the power lift 4 is actuated and the plow is displaced relatively, perpendicular to the ground, by an amount a. In this connection it should be pointed out that the relative movement as well as the disturbance movement of the plow transferred from the tractor result from rotational movements, as for instance the pitch oscillations or the rotation of the tie-rod mechanism about its joints; however, only the vertical components of this movement are of significance, as is represented by the coordinates. This displacement of the plow by the power lift is superimposed with the movement of the tractor z so that a new absolute position a-z of the plow results which in its turn causes a change in the force F as a consequence of the ground characteristic. The control circuit is thus closed.

This control method, as a consequence of a suitable selected constant nominal or set value leads to a constant traction force at the measuring spring, which is achieved via a different penetration depth of the plow and thereby depth of the furrows. With a traction force control therefore a uniform depth of the furrows can be expected only if the changes in the traction force, i.e., the changes in the deformation of the measuring spring were zero. This would require a homogeneous soil i.e., no changes in the resistance with a uniform plowing depth, as well as a path without changes in slope. Furthermore, because of the change of the depth of the furrows via the control a decrease in the revolutions of the motor is prevented, which depending on conditions may lead to the team getting stuck. Such a deadlock can be prevented however only as long as the traction force transmitted by the drive wheels of the tractor can be supported by the ground. If the transferable traction force falls below the nominal value of the traction force due to a deterioration of the frictional force conditions the control circuit calls for an increase in the traction force and to this end reacts in the sense of a positive feedback, i.e., the plow will be lowered further in order to accomplish a higher traction force; consequently slippage of the wheel will increase and this will finally lead the team to get stuck, if no manual correction takes place. A manual interference must be continuously taken also if a uniform depth of the furrows is required which because of the principle of the design of the control circuit cannot be given automatically with the ground and field conditions encountered in reality. As will follow from FIG. 2 the resistance of the ground as the main quantity influencing the traction force to be regulated, forms an element of the control circuit which has a major effect on the dynamics and the sensitivity of the same.

In addition to the traction force control circuit the power lift may also be provided with a position control circuit which facilitates the coupling and decoupling of the attachments and which with implements carried by the tractor, such as fertilizer spreaders, and field spraying apparatus controls the position relative to the tractor. Under special circumstances during working of the field both the traction force and position control circuit may be utilized.

For purposes of realizing this known method in a technical sense with respect to the implements, essentially three possibilities are known:

A mechanical-hydraulic control or closed loop control (MHC) in which the control variables traction force and relative position tractor/plow are mechanically detected and are transferred via a linkage and lever to a slide for the valve of the power lift. This type of control has strict limits regarding stability and sensitivity because of the direct signal feedback without amplification. For instance, with the changes to be expected in the traction force, the measuring spring has to permit deformations which are sufficient for an actuation of the slide, which circumstance, together with the large masses of the attachments leads to signal delays which in addition increase the tendency to oscillations (instability) and decrease the responsiveness of the control circuit. Moreover, this type of (MHC) control, because of friction and play in the mechanical construction of the tie-rod mechanism leads to continuous oscillations which must be suppressed by a wide control resolution or operating threshold which may amount to more than 20% of the maximum traction force.

These disadvantages are reduced by a servo-hydraulic closed loop control in which the control signals are hydraulically conducted and amplified. Play and friction which would favor oscillations do not occur in the hydraulic feedback. In addition the path of deformation required at the measuring spring can be reduced considerably.

Also in an electro-hydraulic closed loop control the principle of the traction force and relative position feedback is maintained while the measurement of the traction force is effected by means of electronic systems. The deformation of a conventional mechanical-hydraulic control (MHC) measuring member is detected by means of an inductive displacement pick-up or transducer which however does not present in principle any functional advantages even though the tie-rod systems and its negative influences on the control are eliminated. With a direct measurement of the traction force in the connection bolts (force measuring bolts) of the control linkage, preferably in the guide-rods, the construction of the power lift is simplified and because of the high stiffness of the measuring member the dynamics of the control system is improved. Just as in the case of the measurement of the forces by means of a potentiometer (potentiometric force measurement) in both guide-rods in a rhombus-like opening (force measuring ring) the disadvantages lie in large loads on the measuring members which may become dangerous because of wear and in the hysteresis behavior caused by mechanical friction, as well as in the arrangement of electronic components such as sensors, in an environment that is hostile to electronic components.

Independently of the choice of the respective realization of the apparatus, control by traction force especially traction force closed loop control because of its control principle has the following disadvantages which can be summarized as follows. In the cultivation of the soil it does not make possible a genuine automation since in practice, especially with ground having a strongly changing resistance characteristic, the depth of the plow must be observed and the control must be manually interfered with. Other methods of operation which require a uniform working plane above the ground can only be executed as a control in which the relative position of the tractor to the plow is the control standard or variable, which because of the tractor pitch movements automatically leads to errors. The structural design of the traction force measuring device poses considerable difficulties since this elastic element must not only measure and support great traction forces but must also transmit the considerable dynamic forces during transport of the heavy attachments. As far as the control technique is concerned the non-linear and non-stationary behavior of the ground as an element of the control circuit is an obstacle in optimizing the traction force closed loop control. Its transfer characteristic enters as a factor into the feedback amplification so that the tendency to oscillations (stability limit) and the response speed as well as the sensitivity and accuracy of the control are determined by the of soil.

BRIEF SUMMARY OF THE INVENTION

It is an object of the invention to provide a method for controlling an attachment to an agricultural tractor which guarantees the setting and maintaining of the position of the attachment or implement relative to the ground. It is especially an object of the invention to genuinely hold the implement at a specific depth, i.e., to make possible the positioning of the attachment in space which is not influenced by the oscillations of the tractor.

In accordance with the invention, this object has been solved by ascertaining or determining and utilizing as the control standard or controlled variable the absolute movement of the attachment. The absolute movement of the attachment is electrically determined and is utilized as the control standard or controlled variable and is preferably controlled in such a way that it will become zero, i.e., that the plow does not change its position in space. In this way any force measurement influenced by the characteristic of the ground resistance is eliminated and thus the ground as an element of the control circuit itself, so that its irregularities cannot unfavorably influence the control. Using this control method operating in opposition to an absolute movement of the attachment brings about that the same maintains its constant position in as well as outside the ground.

In a variation of the method according to the present invention, the absolute movement of the implement is determined and detected directly at the implement, for instance electrically, and is then taken into consideration as a control factor or controlled variable. This solution has the advantage that a single sensor for determining a coordinate of the team is sufficient for the control circuit.

According to a further development of the invention the absolute movement can be determined and detected by having the motion sensor mounted directly on the implement. This development is advantageous in that the measurement accuracy of the motion sensor may be maintained relatively high. On the other hand, this development leads to the necessity that upon a change of the implement the motion sensor has to be changed too. In order to overcome this operational disadvantage, two further solutions are proposed. The first possibility consists in that the absolute movement is determined and detected by a motion sensor arranged at the powerlift of the tractor. Because of the direct and rigid coupling between the powerlift and the implement the absolute movement determined by the motion sensor at the powerlift is directly proportional to the absolute movement determined by the motion sensor mounted directly at the implement.

A further possibility of determining the absolute movement of the implement and to utilize it as a control quantity or factor without having to exchange the motion sensor upon a change of the implement comprises measuring the movement of the tractor and to advance this measured value to a control circuit for the relative position between the tractor and the implement with a reverse sign as leading quantity or command variable In this case the tractor moves the powerlift to carry out a corrective movement corresponding to this interference or disturbance movement. With a suitable adjustment of the control circuit this corrective movement may be such that the difference between the powerlift movement and the tractor movement becomes zero. Thus the position of the implement relative to the ground remains unchanged. Experience has shown that the transmission behavior and transfer characteristic of the motion control is not influenced by the connection of the sensor to the tractor but then on the other hand, regarding handling and signal transmission, a great advantage is achieved, namely that the sensor does not have to be changed when changing the implement. This has the additional advantage that the elements of the electronics feedback, i.e., the transducer, the amplifier, as well as the wires and connectors can be protected more reliably from environmental influences.

Further favorable developments of the method according to the present invention comprise in addition as a further control factor or controlled variable the relative position of the tractor and attachment is utilized and so controlled that its time median is constant. This means that over time the shifting amount resulting from a relative movement by which the attachment is displaced upwardly (negative) or downwardly (positive) cancel each other out, in sum. The realization and reflection that the team of tractor and attachment upon again reaching the starting position, for instance after a round trip, should assume again the same position as at the beginning, leads to the result that slowly occurring vertical movements of the tractor, for instance when passing over a hill are also followed by the attachment, i.e., that in such a case the attachment following the absolute movement of the tractor changes its position in space and maintains the same distance to the ground. In this way one prevents that for instance when plowing with a plow as an attachment the same is pulled through the hill. The absolute movement of the attachment about its absolute position and brought about by the pitch movement of the tractor is held to zero by this control.

In order to avoid overloading the motor of the tractor which could lead to stalling, the rotational speed of the motor is superimposed as an auxiliary control factor or controlled variable on the control circuit, and this auxiliary control acts on the control in case of an inadmissible decline of the rotational speed of the motor and lifts the attachment by a certain amount in order to decrease the load on the motor.

BRIEF DESCRIPTION OF THE DRAWINGS

Embodiments of the invention shall be explained in greater detail in connection with the accompanying schematic drawings, in which.

DETAILED DESCRIPTION OF PREFERRED EMBODIMENTS

Figure 1:
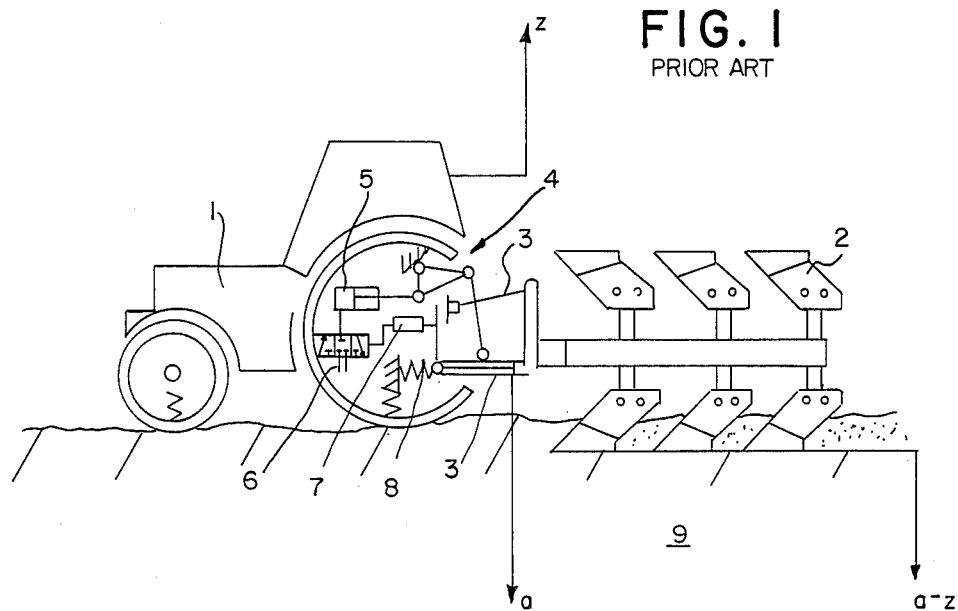
FIG. 1 shows a team consisting of a tractor and attachment, and which is designed in accordance with the known traction control method described above.
Figure 2:
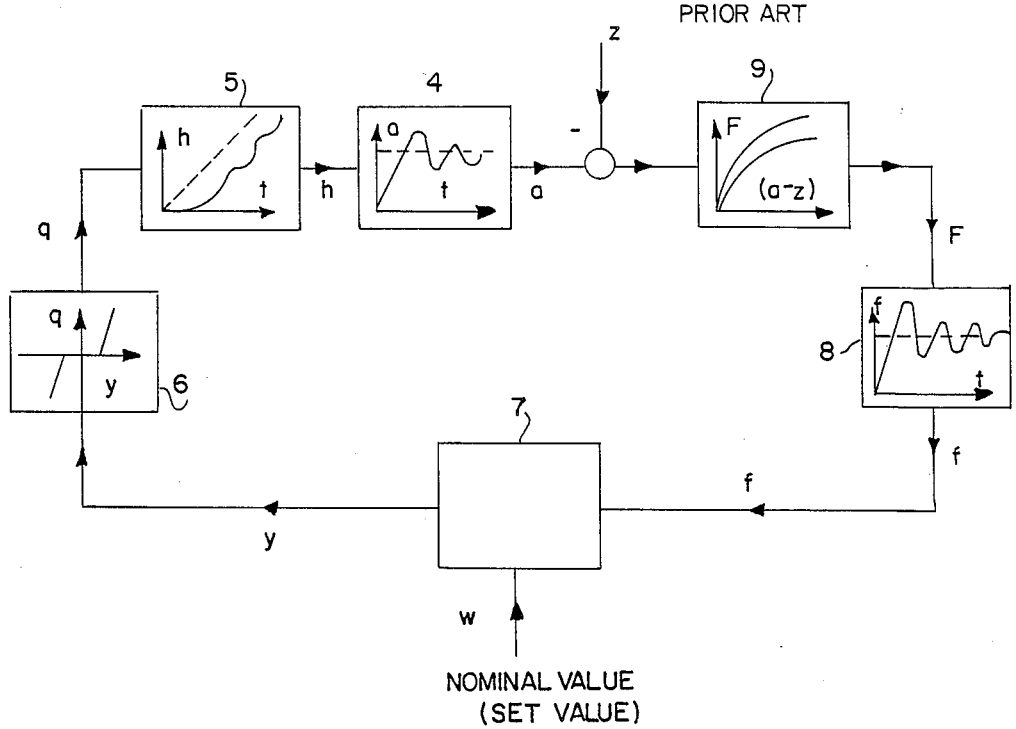
FIG. 2 is a block diagram for the control circuit of the team according to FIG. 1.
Figure 3:
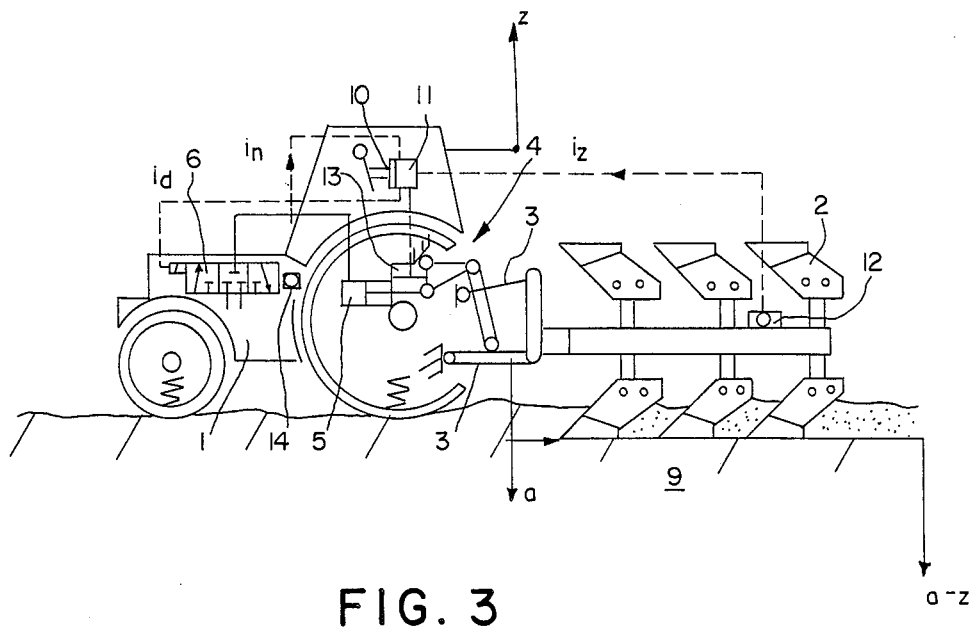
FIG. 3 shows a team consisting of a tractor and an attachment in which the control method according to the present invention is realized.

FIG. 3 shows a tractor 1 with attached plow 2 which is controlled in accordance with the method according to the invention. The reference numbers or respectively the same coordinates as shown in FIG. 1 designate the same components and the same movements respectively and shall not be repeated here. In the vicinity of the seat for the tractor driver there is provided a nominal value transmitter (selector) or setting means 10 in combination with a controller 11 that can be adjusted manually by the driver. On the plow there is mounted a motion sensor 12 which measures for instance the absolute acceleration of the plow and sends a corresponding signal $i_z$ to the controller which in turn transmits a manipulating or control signal $i_d$ to a valve 6 actuating a cylinder 5 of the power lift.

Figure 4:
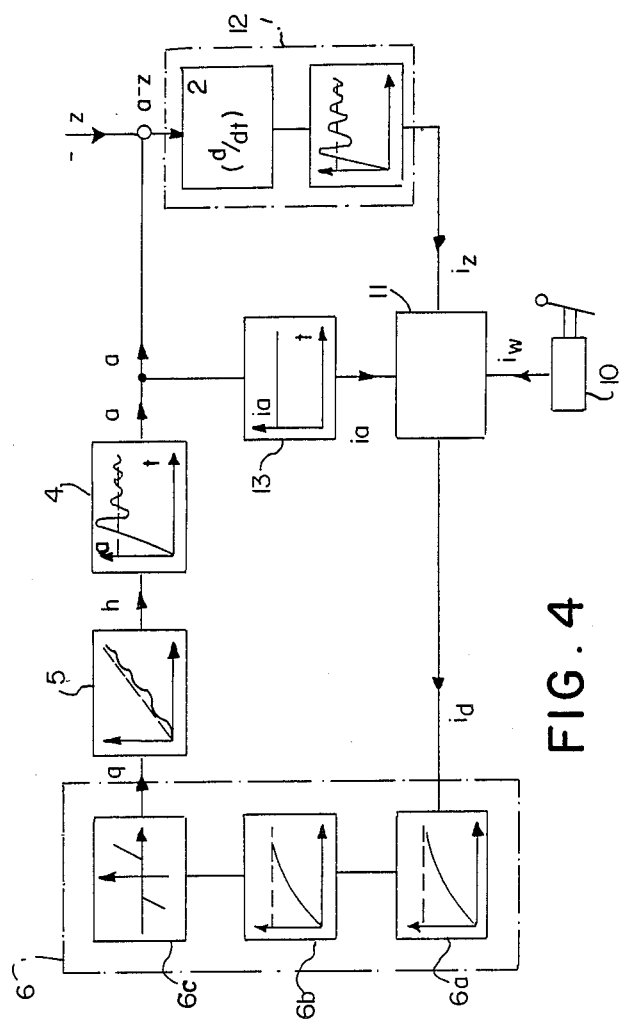
FIGS. 4 and 5 are block diagrams for the control circuit according to the invention applied to the team according to FIG. 3.

FIG. 4 shows the block diagram for this control circuit. On a relative movement a of the plow caused by the power lift 4 the disturbance movement or interference movement z of the tractor is superiposed so that for the plow there exists an absolute movement a-z which depending upon the amount of the two movements is directed into the ground or out of the same. This absolute movement of the plow is detected by the movement sensor 12 as an acceleration a-z which in FIG. 4 is expressed as the double time derivation $(d/dt)^2$ of the absolute coordinate ä-z̈ of the plow. This movement sensor transmits to the controller 11 the signal $i_z$ corresponding to the measured acceleration. As further illustrated, the movement a of the plow is detected by a position sensor 13 and from this a signal $i_a$ constant over the time median is determined for the controller in such a way that the relative movements of the plow in summation will become zero when summed up over a certain time. This corresponds to a coupling which is rigid over the time median and has for its purpose a mentioned above that the plow will follow vertical tractor movements which occur for instance when passing over a hill and will vary its position in space. The controller forms from the signals $i_z$ and $i_a$ as well as from the signal $i_w$ determined and defined by the nominal value input 10 an adjustment or manipulating signal $i_d$ acting upon valve 6 and determining the pressure fluid flow g thereof which causes the stroke h of the cylinders 5. The block diagram of the valve 6 according to FIG. 4 is subdivided into three blocks which represent the transfer function or transient response of a magnet 6a actuating a piston of the valve, a pre-control 6b, and a control or guiding edge 6c the position of which ultimately determines the amount of valve opening and thereby the pressure fluid flow. From the stroke h of the cylinder, via the power lift, a new relative movement, a, of the plow results which is utilized on the one hand for the formation of a signal constant over the time median, and on the other hand, superimposed by the disturbance movement z from the movement sensor for the absolute acceleration of the plow. The control circuit is thus closed. The setting or manipulating signal $i_d$ of the controller is formed in such a way that an absolute movement of the plow is opposed, i.e., that the same is controlled to be zero, while changes in the absolute position of the plow about which the movements controlled to zero occur, corresponding to a change in the absolute position of the tractor are possible because of the feedback of the relative position a so that over the time median a rigid coupling results.

Figure 5:
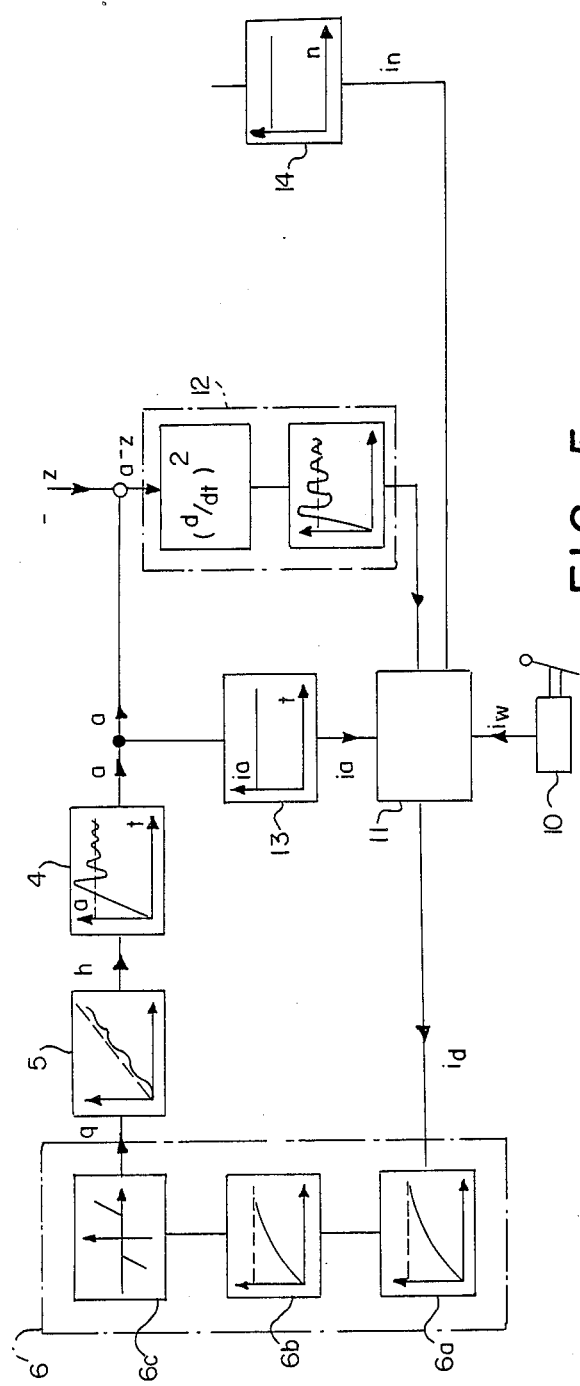

With such a control method there can occur the case in which because of a strongly increased resistance of the ground which does not have any effect on the control and thereby upon the position of the plow, the load of the tractor increases inadmissibly since the plow in this case in contrast to the previously described traction force control is not lifted. It is, therefore, advisable, as indicated in FIGS. 3 and 5, to determine the rotational motor speed of the tractor via a speed sensor 14 sensing the revolutions of the motor and which furnishes the control with a further signal $i_n$ which upon an inadmissible motor speed occuring causes a corresponding displacement of the attachment Thus, for instance the plow is displaced somewhat upwardly if because of any excessively increased ground resistance the load on the motor increases and its rotational speed reaches an impermissibly low value. For the accurate determination of the motor load it is of course possible to take into consideration other characteristic factors as auxiliary control factors or controlled variables.

The control method according to the invention aside from basic advantages making possible a genuine constant position control of the attachment brings also about several structural advantages. Since the force measuring element is superfluous the linkage of the power lift may be designed exclusively with a view towards the highest possible loads which may occur when transporting heavy attachments or implements. For the purpose of limiting the load of the motor there is already available at the driver seat a mechanical revolution signal and the conversion of the signal into an electrical one is easily possible, for instance by means of a tacho-alternator or motor tachogenerator. The electronic measuring, feedback and processing of the motion signals and the load signals of the motor can be optimized in the controller so that the motion and load control is adjustable independently of the tractor, the attachment and the type of ground. The environmental conditions for the movement sensor at the attachment are more favorable than the conditions in the area of the lower linkage. Moreover, the structural design of a motion sensor 12, illustrated in FIG. 6, is a unit which can easily be completely encapsulated.

Figure 6:
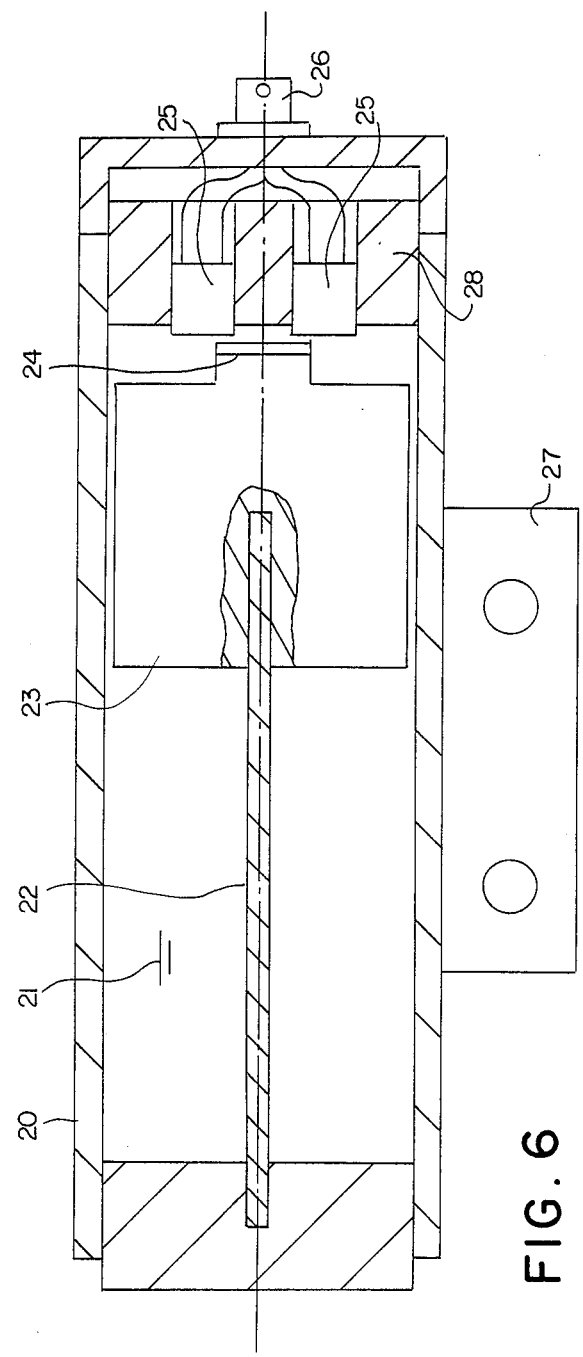
FIG. 6 shows an acceleration sensor for realizing the control method according to the invention.

The motion sensor 12 according to FIG. 6 detects the acceleration, and can therefore also be called an acceleration sensor. It comprises a housing 20 closed on all sides and filled with oil 21. A mass 23 connected to a leaf spring 22 extending in longitudinal direction of the housing "swims" in the oil. Opposite to mass 23 there is arranged a receiver 28 into which two electronic path sensors 25 are inserted which by means of electrical cables are connected at the outside of the housing to a cable connecter 26. The mass 23 has a protrusion with a flat end face on which is provided a measuring surface 24 located with slight spacing opposite an end face of the electronic path sensors. Depending on the acceleration of the structural element to which the acceleration sensor is attached, the mass is subject to a deflection damped by the oil 21, and in which deflection is detected by the path sensors and converted into an electrical signal which can be picked up at the cable connection 26 Housing 20 of the acceleration sensor is furthermore provided with a connecting flange 27 for connection to the attachment.

The acceleration sensor shown in FIG. 6 operates quasi translatively, i.e., it detects primarily acceleration in a direction perpendicular to the leaf spring 22. In this way the acceleration sensor is capable of transforming pitching motions as well as pure lifting motion of the team into a representative output signal. However, since the occurring lifting motions of the machine and of the team are of relatively minor importance compared to the pitching motions of the agricultural tractor or of the team, for a reliable determination of the absolute movement of the implement it would be sufficient to have an acceleration sensor which merely responds to a rotary acceleration about a horizontal transverse axis Q of the team or of the tractor.

In the embodiment described above the acceleration sensor 12 is mounted directly on the implement 2. Such an arrangement of the acceleration sensor requires that with an exchange of the implement the sensor has to be exchanged too and that signal transferred devices leading to the acceleration sensor are subject to environmental influences over a relatively long distance. This may lead to difficulties in handling the apparatus and also to operational difficulties. In order to prevent this in accordance with the invention further embodiments have been developed which are shown in FIGS. 7-9.

Figure 7:
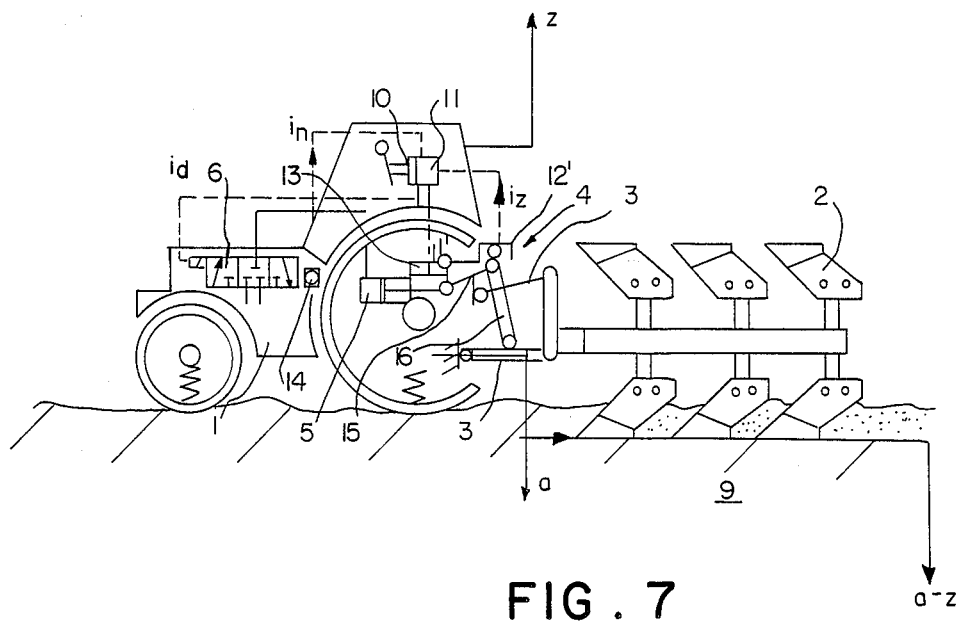
FIG. 7 shows a team corresponding to FIG. 3 but in which the motion sensor is a mounted at a different location.

The embodiment shown in FIG. 7 differs from that shown in FIG. 3 merely in that the motion sensor 12' and which otherwise may be designed like the motion sensor 12 according to FIG. 3 now detects the vertical movements of an upper pivotal point 15 of a power lift 16 pivoted to tie-rod mechanism 3. Because of the rigid coupling between the power lift 16 and the implement 2 the output signal $i_z$ by the motion sensor 12' is directly proportional to the output signal produced by the motion sensor 12 according to FIG. 3. Thus, the control circuits shown in FIGS. 4 and 5 may be applied without any change in the team according to FIG. 7, for purposes of carrying out the position control of the implement, according to the invention. Therefore, the control circuit is not further dicussed here, and in order to simplify the description of the team the same reference characters has been used as in FIG. 3.

Figure 8:
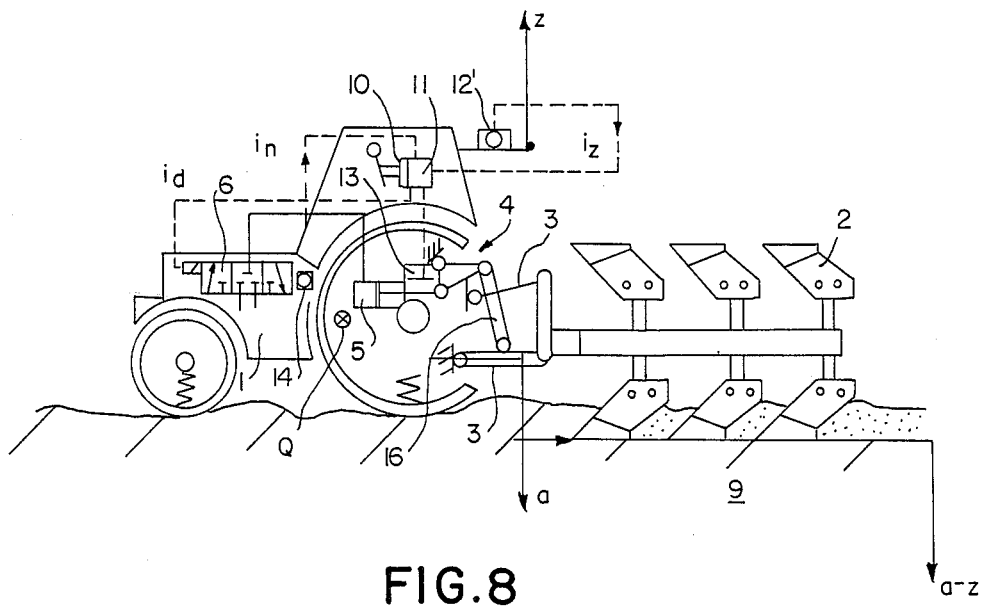
FIG. 8 illustrates a team similar to that of FIG. 7, in which the motion sensor is arranged at the tractor.
Figure 9:
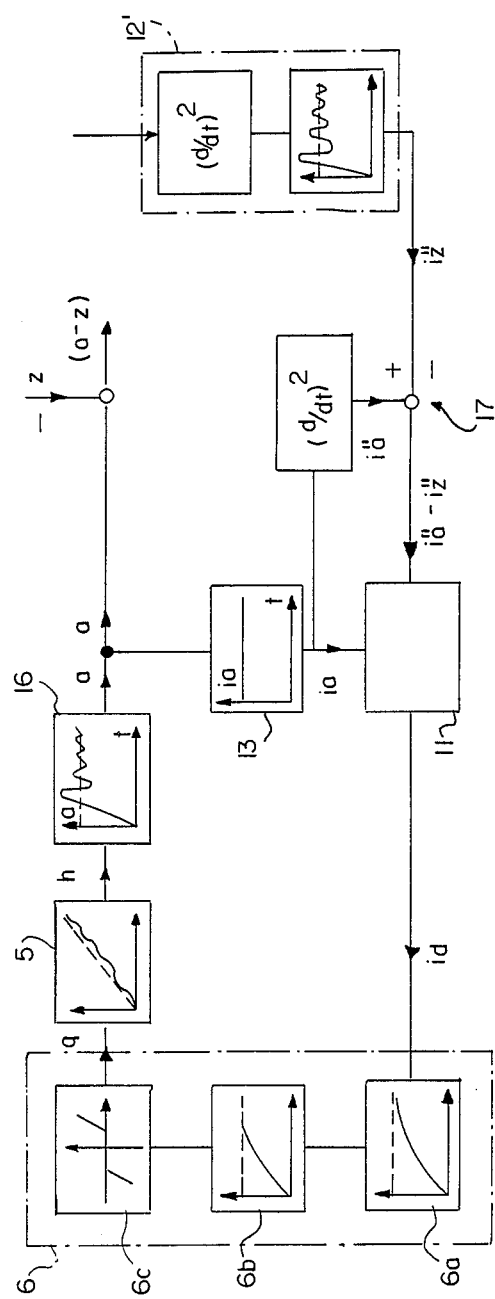
FIG. 9 is a block diagram for the control circuit accurately to the invention as applied to the team of FIG. 8.

Still another possiblity of carrying out the position control of the implement according to the present invention, without mounting the motion sensor 12 at the implement 2, per se, is shown in FIGS. 8 and 9. In order to simplify the description, again, the elements of the team corresponding to those described in connection with FIGS. 3 and 7, are provided with identical reference characters. The team according to FIG. 8 differs from the previously described arrangements in that the motion sensor 12' does not detect the absolute movement of the implement, but the absolute movement z of the tractor 1. In order to be able to carry out the position control of the implement, according to the invention, in this case the control circuit is structured slightly differently than that shown in FIGS. 4 and 5. The controlled system or plant consisting of valve, cylinder and power lift may correspond to that shown in FIGS. 4 and 5. The determination of the control standard or controlled variable fed to the controller, namely the absolute movement of the implement, however, is effected in a manner different from that represented in the FIGS. 5 and 6. More specifically, the movement of the tractor 1 measured by the motion sensor 12' is transmitted to the control circuit at a point 17 at which there is present a signal $i_a$ representing the relative position of the implement in comparison to the tractor, as a leading quantity or command variable with a reversed sign $(-i_z)$ and is fed to the controller superimposed on the signal $i_a$. Since the motion sensor 12' preferably $i_z$ again an acceleration sensor the output signal is represents the absolute acceleration of the tractor at point 17. This signal is advanced as a leading quantity or command variable with a negative sign to the control circuit, at a point at which the signal $i_a$ is the second derivative over time of the signal $i_a$, i.e., present. Between point 17 and the controller there is thus present a signal $i_a\text{-}i_z$, which corresponds to the signal $i_z$ according to FIG. 4. The control circuit according to FIG. 9 thus has the same control quantity or controlled variable as the previously described control circuit according to FIGS. 4 and 5.

If, with the embodiment according to FIGS. 8 and 9, the tractor moves, the power lift 16 carries out a defined correction movement corresponding to the above mentioned tractor movement which in the control circuits according to FIGS. 4 and 5 was an interference movement z. With an appropriate adjustment or turning of the controller to the control system or plant the difference $i_a\text{-}i_z$ present after the point 17 of the control circuit can be controlled to assume the value zero, so that the position of the implement with regards to the soil or ground as a consequence thereof may remain unchanged. Also with the control circuit according the FIG. 9 the rotational speed of the motor of the tractor determined by a revolution sensor 14 may be taken into account as auxiliary control quantity or controlled variable, just as shown in FIG. 5.

It was mentioned above that the motion sensor 12 or 12', respectfully, detects movements, and preferably acceleration in the direction of the coordinate z. This, however, does not require that the acceleration receiver has to operate purely translatively. As a matter of fact, also with the embodiments of FIGS. 7-9 advantageously an acceleration sensor 12' may be used which receives exclusively rotary acceleration about a horizontal transverse axis Q of the tractor 1 (see FIG. 8).

In summary, there is disclosed a method of controlling an attachment or implement of an agricultural tractor. By means of a motion sensor for example connected to the attachment the absolute movement of the attachment is determined or ascertained and is utilized as a control factor or controlled variable while the relative motion of the attachment with respect to the tractor and influenced by a controller and carried out via a power lift, is determined in such a way that the absolute movement of the attachment becomes zero. This control method makes it possible that the attachment maintains a constant position in space in spite of pitch movements of the tractor acting as interference or disturbance motions This guarantees an automatic tilling practice for instance a uniform depth of the furrows when plowing. By superimposing feedbacks of further control factors or controlled variables, such as relative position and motor load, changes in the absolute position of the attachment are possible and overloading of the motor is avoided.

Various modifications in structure and/or function and/or steps may be made by one skilled in the art to the disclosed embodiments without departing from the scope of the invention as determined by the claims.

What is claimed is:

1. A method of controlling an attachment connected to an agricultural tractor via a power lift without measuring the pulling force, comprising the steps of:
   detecting or determining the absolute vertical movement of the attachment by a motion sensor;
   generating signals corresponding to the absolute vertical movement of the attachment and the relative position of the attachment with respect to the tractor; and
   directly applying or utilizing the sensed absolute vertical movement and the relative position between the attachment and the tractor in the form of values of these signals as feedback signals for an attachment control circuit.

2. A method according to claim 1 wherein the absolute movement is determined and detected at the attachment.

3. A method according to claim 2 wherein the motion sensor is arranged at the attachment.

4. A method according to claim 2 wherein the motion sensor is arranged at the power lift of the tractor.

5. A method according to claim 1 wherein the movement of the tractor is measured and is advanced to a control circuit for the relative position between the tractor and the attachment with reverse sign as a leading quantity or command variable.

6. A method according to claim 1, comprising the step of establishing as a first additional control factor or command variable a coordinate for the movement between the attachment and the tractor is utilized.

7. A method according to claim 1, wherein a controller holds the absolute movement of the attachment to zero, and that the coordinate for a relative movement is held constant over a time median.

8. A method according to claims 1 or 2, comprising the step of establishing a factor representing the load on the motor of the tractor and superimposing the load factor as a second additional control factor or controlled variable on the control circuit.

9. A method according to claim 8, wherein the motor speed is the second additional control factor.

10. A method according to claim 9, wherein the motion sensor measures speeds or accelerations.

11. A method according to claim 8, wherein the motion sensor measures speeds or accelerations.

12. A method according to claim 7, comprising the step of establishing a factor representing the load on the motor of the tractor and superimposing the load factor as a second additional control factor or controlled variable on the control circuit.

13. A method according to any one of claims 3,4,5,6,7 or 12 wherein the motion sensor measures speeds or accelerations.

14. A method according to claim 13, wherein the motion sensor measures exclusively rotary acceleration about a transverse axis of the tractor.

15. A method of controlling an attachment connected to an agricultural tractor via a power lift comprising the steps of:
   summing the relative movement of the attachment and a disturbance movement to determine an absolute movement;
   detecting the absolute movement by a motion sensor as an acceleration value;
   transmitting the acceleration value to a controller of the power lift;
   detecting the movement of the attachment by a position sensor to generate a signal to the controller
   whereby the steps determine the absolute vertical movement of the attachment and the sensed vertical movement is feedback as a control value for positioning the attachment independent of the disturbacne movement.

* * * * *